Dec. 18, 1934.    F. J. BIGLER ET AL    1,984,515
BRAKE MECHANISM
Filed Feb. 10, 1931
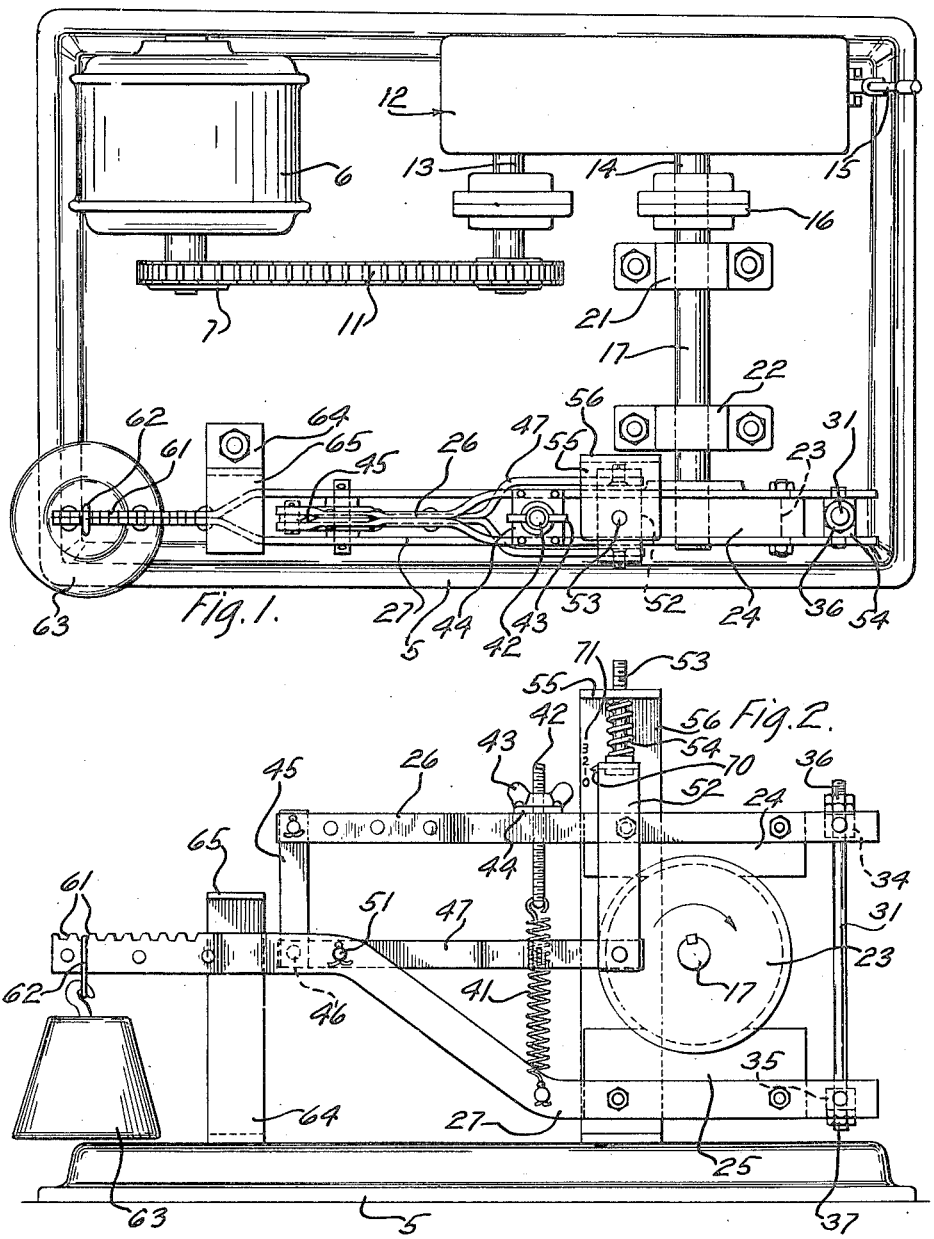
Inventors
F. J. Bigler
E. J. Crane
By H. B. Whitfield  Atty.

Patented Dec. 18, 1934

1,984,515

UNITED STATES PATENT OFFICE 1,984,515

BRAKE MECHANISM

Fred J. Bigler, Chicago, and Edward J. Crane, Berwyn, Ill., assignors to Western Electric Company, Incorporated, New York, N. Y., a corporation of New York Application February 10, 1931, Serial No. 514,719

9 Claims. (Cl. 188—83)

This invention relates to brake mechanisms and more particularly to a self-adjusting Prony brake mechanism.

It is an object of the present invention to provide an automatically adjusted mechanism for exerting a substantially constant torque on rotating members.

In accordance with one embodiment the invention contemplates a means for testing an apparatus to determine the operative life of the mechanical parts thereof by exerting a constant load upon a rotating shaft connected operatively therewith wherein brake members are forced into engagement with a drum secured to the shaft with a constant pressure for exerting the desired torque, which pressure is automatically released upon the development of a torque in excess of that desired and is reapplied when the torque again approaches the desired value.

Other objects and advantages of the invention will more fully appear from the following detailed description, reference being had to the accompanying drawing, wherein Fig. 1 is a plan view of the apparatus embodying features of the invention, and Fig. 2 is a side elevational view of the structure shown in Fig. 1, parts being omitted to clarify the disclosure.

Referring now to the drawing wherein like reference numerals designate the same parts throughout the several views, the numeral 5 designates a base upon which are mounted the operating parts of the mechanism. Secured to the base in any known manner is an electrical motor 6 having attached to the shaft thereof a sprocket wheel 7 for driving through a sprocket chain 11 an apparatus, the mechanical characteristics of which are to be determined. In the embodiment of the invention disclosed herein the article being tested is a transmission mechanism indicated generally by the numeral 12, which is adapted to receive power from the motor 6, through a shaft 13 and transmit it to a second or output shaft 14. The mechanism under test may be any set of mechanical gears or like mechanism, the transmission indicated by the numeral 12 being selected simply for the purpose of illustration and as shown in Fig. 1 being provided with a gear shifting lever 15.

Attached to the output shaft 14 of the transmission mechanism 12 by a joining member 16 of any known type is a shaft 17 journaled in bearings 21 and 22. The shaft 17 has mounted on the end thereof a brake drum 23 adapted to be engaged by brake shoes 24 and 25 upon its upper and lower peripheral surfaces respectively. The brake shoes 24 and 25 have secured thereto bifurcated levers 26 and 27 respectively, the right ends of which (Fig. 2) are connected together by a link 31 and pivot blocks 34 and 35. The pivot blocks 34 and 35 have apertures therein for receiving the link 31 which is threaded at its ends for receiving adjusting nuts 36 and 37 so that the effective length of the link 31 may be changed to compensate for wear upon the brake shoes 24 and 25.

Intermediate the ends of the bifurcated levers 26 and 27 there is a spring 41, one end of which is secured to the lever 27 and the other end of which is secured to a threaded rod 42 which has cooperating therewith a wing nut 43 engaging a plate 44 mounted upon the upper surfaces of the furcations of the bifurcated lever 26. The spring 41 is adapted to urge the left ends (Fig. 2) of the bifurcated levers 26 and 27 towards each other and its effectiveness may be varied by adjusting the wing nut 43. The left end (Fig. 2) of the lever 26 has pivoted thereto a link 45 which is in turn pivoted at 46 to a forked lever 47, the open or right end of which extends on each side of the drum 23.

The lever 47 is pivoted at 51 to the bifurcated lever 27 and has pivotally mounted at its right end an inverted U-shaped member 52 which partially surrounds the drum 23 and extends upwardly therefrom. Upon the upper surface of the inverted U-shaped member 52 there is mounted a spring centering rod 53 surrounded by a coil spring 54 which engages the upper surface of the inverted U-shaped member 52 and the lower surface of a horizontally extending portion 55 of a bracket 56 which is rigidly mounted upon the base 5. It will be noted that the spring 54 is stronger than the spring 41, the purpose of which arrangement will become apparent as the description progresses.

The left end of the bifurcated lever 27 is notched as shown at 61 for receiving a link 62 which supports a weight 63 the position of which may be varied relative to the lever 27 for varying the amount of torque exerted by the brake shoes 24 and 25 upon the drum 23. A bracket 64 is secured to the base 5 and has a horizontally extending portion 65 which extends over the left end of the bifurcated lever 27 to prevent the lever 27 from moving upwardly beyond a certain point in the event of breakage of any of the parts of the apparatus during its operation.

The structural features of the disclosed embodiment of the invention having been described in detail, the operation of the structure will now be described briefly for the purpose of making more clear the invention. Let it be assumed that it is desired to make a life or endurance test of the transmission unit 12, and that the amount of motive power supplied to the transmission through the motor 6 is a known quantity. It is then necessary to apply a load to the output shaft 14 of the transmission unit which will be substantially constant and will be of a value that is known to be proportional to the load which the transmission unit 12 will have to drive when put in operation to serve its intended purpose. The output shaft 14 of the transmission unit may be connected to the shaft 17, the weight 63 positioned upon the lever 27 at a predetermined distance from the shaft depending upon the torsional load which it is desired to place upon the shaft, and the motor started whereupon the brake shoes 24 and 25 may be placed in engagement with the drum 23. The lock nut assemblies 36 and 37 may be adjusted so that the brake shoes 24 and 25 will be substantially parallel to each other and the lever 27, from the pivot point 51 to the left end thereof, will be substantially horizontal, then, by adjusting the wing nut 43 to apply the force stored in the coil spring 41 to the bifurcated levers 26 and 27, the brake shoes will be urged into frictional engagement with the rotating brake drum. The motor 6 will then drive the transmission 12 and through the transmission will rotate the brake drum 23 in the direction indicated by the arrow in Fig. 2. The frictional engagement of the shoes 24 and 25 with the drum 23 will tend to rotate the levers 26, 27, 47, 45 and the link 31 with the brake drum in a clockwise direction, whereupon the weight will be lifted a short distance and will move up and down within a limited range as the load reaches its proper value. Although the weight 63 is carried by the levers 27, its downward force is applied uniformly to the entire link and lever mechanism for the reason that the levers 26 and 27 are drawn toward each other with equal force upon each side of the shaft 17 and the force of the weight will tend to move the mechanism counter-clockwise or tend to prevent clockwise movement thereof. It will be understood that spring 41 is adjusted to apply sufficient friction to the drum to lift the weight 63 from its position on the base 5. There is, therefore, a normal tendency for the brake mechanism to be rotated in a clockwise direction, and, of course, this tendency will be greater if the friction is increased as, for example, by heating of the brake shoes and consequent swelling thereof, or the sticking of the brake shoes to the drum. Such tendency to rotate in a clockwise direction will be compensated for, however, by the link and lever mechanism which, as soon as the mechanism rotates a predetermined distance to carry the U-shaped member 52 upwardly, this member will encounter the resistance of the spring 54 and will be limited in its upward movement. Since the rest of the link and lever mechanism is tending to rotate relative to the U-shaped member 52, the lever 47 will be rocked about the pivot 51, and in so doing, the link 45 will impart a relative upward movement to the lever 26 away from the lever 27 to move the levers 26 and 27 away from each other to release the brake shoes 24 and 25 from the drum 23. The spring 54 is preferably of such a length that it will not counteract the force of the spring 41 when the weight 63 is at rest on the base 5, but as soon as the torque increases beyond that desired, due to the increase in friction between the brake shoes and the drum, to cause the link and lever mechanism to move clockwise, the spring 54 will prevent upward movement of the U-shaped member 52 beyond a desired distance, causing the lever 47 to rock about its pivot 51 relative to the lever 27, bringing about a movement of the lever 26 relative to the lever 27 to decrease the force of the brake shoes in engagement with the drum.

If it is desired to measure accurately the variation from a predetermined amount of the torque exerted upon the drum, this may be accomplished by placing an indicator 70 on the inverted U-shaped member 52 for cooperating with a scale 71 inscribed upon the vertical portion of the bracket 56. With such an arrangement any torque in excess of that exerted by the weight 63 will cause the member 52 to move upwardly compressing the spring 54 and indicating the additional torque exerted through the movement of the indicator 70 relative to the scale 71.

It will be apparent that with the mechanism just described an endurance test may be run to test the mechanical properties of any mechanical unit by setting the brake mechanism and letting it run for long intervals without its requiring any attention. Likewise, the mechanism described may be used for measuring torsional loads upon shafts in the method usually used in conjunction with Prony brakes with the added feature that there is no danger of the brake as a whole rotating through any great distance about the brake drum to thereby endanger the operators.

Although a specific embodiment of the invention has been described in detail hereinbefore, it is to be understood that other modifications and adaptations of the mechanism may be made without departing from the scope of the appended claims.

What is claimed is:

1. In a Prony brake mechanism, a drum, a pair of brake shoes for engaging said drum to apply torque thereto, levers secured to said brake shoes, means for interconnecting adjacent ends of said levers, expansible means for connecting the other ends of said levers, means for normally urging said levers toward each other under a predetermined tension, and means for expanding said expansible means to vary the effectiveness of said urging means for maintaining constant the torque applied by the shoes.

2. In a Prony brake mechanism a brake drum, brake shoes associated therewith, means for setting the brake shoes into a predetermined frictional relationship with respect to the brake drum to exert a predetermined torque on the drum, and means responsive to the development of a friction between the brake shoes and the brake drum in excess of a predetermined amount for releasing the brake shoes to decrease the friction between the brake shoes and the drum to maintain a predetermined torque on the drum.

3. In a Prony brake mechanism a brake drum, brake shoes associated therewith, means for urging the brake shoes into frictional engagement with the brake drum at a predetermined pressure, and automatically actuated means for releasing the brake shoes from engagement with the brake drum upon an increase in friction between the shoes and the drum in excess of a predetermined amount, said last named means being rendered ineffective when the frictional force of the brake shoes upon the brake drum has been reduced to said predetermined amount.

4. A Prony brake mechanism comprising a rotatable drum, means frictionally engaging the drum to apply a torsional load thereto during its rotation, means for applying a predetermined pressure to said means, and means for automatically reducing said pressure when the effectiveness of said frictional engaging means increases.

5. A Prony brake mechanism comprising a drum, a pair of brake shoes for frictionally engaging said drum, means for urging said brake shoes into engagement with the drum with a predetermined pressure, and means for automatically varying the effectiveness of said urging means in proportion to variations in the effectiveness of the brake shoes.

6. A Prony brake mechanism comprising a rotatable drum and pair of elements disposed upon opposite sides of said drum, brake shoes carried by said elements for frictionally engaging said drum for creating a braking force thereon, means for urging said elements toward each other to apply a predetermined pressure of said brake shoes to said drum to maintain a predetermined torque, and means for moving said elements away from each other to decrease the torque during any increase in the braking force between said shoes and said drum.

7. A Prony brake mechanism comprising a rotatable drum, means for rotating said drum about a fixed pivot, framework carrying a pair of brake shoes for frictionally engaging said drum and mounted for a limited rotation about said fixed pivot, means for urging said brake shoes toward said drum for applying a predetermined pressure thereon, a relatively fixed abutment, and an element carried by said framework for coacting with said fixed abutment to reduce said pressure when said framework has rotated a predetermined distance.

8. A Prony brake mechanism comprising a rotatable drum, means for rotating said drum about a fixed pivot, a framework carrying a pair of brake shoes for frictionally engaging said drum and mounted for a limited rotation about said fixed pivot, means for urging said brake shoes toward said drum for applying a predetermined pressure thereon, a relatively fixed abutment, an element carried by said framework for coacting with said fixed abutment to reduce said pressure when said framework has rotated a predetermined distance, a horizontal arm extending from said framework, and a weight adjustable lengthwise of said arm.

9. A Prony brake mechanism comprising a rotating member, a drum fixed to said rotating member, brake shoes for frictionally engaging the drum to apply a torque thereto, means for normally urging the shoes into engagement with said drum under a predetermined pressure, and means actuated for automatically lessening the pressure of the shoes on the drum during any increase in friction between the shoes and the drum for maintaining substantially constant the torque applied to the drum.

FRED J. BIGLER.
EDWARD J. CRANE.